US008453783B2

(12) United States Patent
Hamkins et al.

(10) Patent No.: US 8,453,783 B2

(45) Date of Patent: Jun. 4, 2013

(54) DIFFERENTIAL PRESSURE CONTROL

(75) Inventors: Eric Hamkins, Waukesha, WI (US); Steve Gary Fleischmann, Dubuque, IA (US); Mark Schultz, Delafield, WI (US); Lynn Russell, Eagle, WI (US); Kristen D. Cadman, Dubuque, IA (US)

(73) Assignee: Deere & Company, Moline, IL (US)

(*) Notice: Subject to any disclaimer, the term of this patent is extended or adjusted under 35 U.S.C. 154(b) by 583 days.

(21) Appl. No.: 12/665,391

(22) PCT Filed: Jun. 18, 2007

(86) PCT No.: PCT/US2007/014278

§ 371 (c)(1), (2), (4) Date: Jun. 22, 2010

(87) PCT Pub. No.: WO2008/156444

PCT Pub. Date: Dec. 24, 2008

(65) Prior Publication Data

US 2010/0252354 A1 Oct. 7, 2010

(51) Int. Cl.
*B60K 17/00* (2006.01)

(52) U.S. Cl.
USPC .......... 180/306

(58) Field of Classification Search
USPC ....... 180/306, 307, 308, 309; 701/94; 60/413, 60/415, 416, 468, 469
See application file for complete search history.

(56) References Cited

U.S. PATENT DOCUMENTS

| | | | | |
|---|---|---|---|---|
| 6,945,042 | B1 * | 9/2005 | Walckner | 60/495 |
| 7,059,127 | B2 * | 6/2006 | Bauer et al. | 60/469 |
| 2003/0200747 | A1 * | 10/2003 | Matsumoto et al. | 60/452 |

OTHER PUBLICATIONS

Search Report for Application No. PCT/US2007/014278, 8 pages.

* cited by examiner

*Primary Examiner* — John Walters
*Assistant Examiner* — James Triggs
(74) *Attorney, Agent, or Firm* — Faegre Baker Daniels LLP

(57) ABSTRACT

A vehicle with a load sensing hydraulic control system is disclosed.

21 Claims, 5 Drawing Sheets

DIFFERENTIAL PRESSURE CONTROL

CROSS-REFERENCE TO RELATED APPLICATION

This application is a national stage filing of PCT International Application Serial No. PCT/US2007/14278, filed Jun. 18, 2007, the disclosure of which is expressly incorporated herein by reference.

BACKGROUND

The present disclosure relates generally to hydraulic control systems. More particularly, the present disclosure relates to a vehicle with a load sensing hydraulic control system.

Many pieces of construction equipment use hydraulics to control the functions performed by the equipment. For example, many pieces of construction equipment use hydraulics to control the boom or bucket functions. Boom functions may be characterized as a relatively high pressure function. Bucket functions may be characterized as a relatively low pressure function. During a transition from a high pressure function to a low pressure function, the low pressure function may experience a flow surge. The flow surge might result from the low pressure function sensing a lower load sense pressure while the hydraulic pump senses a higher load sense pressure.

SUMMARY

According to one aspect of an exemplary embodiment of the present disclosure, a vehicle with a load sensing hydraulic control system is provided. The vehicle includes a frame, a plurality of traction devices configured to propel the frame on the ground, a plurality of hydraulic actuators, a variable displacement pump including a pump displacement controller receiving a pump control signal, the variable displacement pump being in fluid communication with the hydraulic actuators through a discharge passage, a load sense system providing maximum pressure signal indicative of the maximum pressure needed by the plurality of hydraulic actuators during operation of the vehicle, an orifice receiving the maximum pressure signal, the orifice being in fluid communication with the pump displacement controller, a check valve receiving the maximum pressure signal and being in fluid communication with the orifice to bypass the orifice when the maximum pressure signal is greater than the pump control signal, and a load sense regulator in fluid communication with the discharge passage and the pump displacement controller, the load sense regulator detecting the maximum pressure signal and the pump control signal to maintain the pressure differential over the orifice below a predetermined level.

According to another aspect of an exemplary embodiment of the present disclosure, a vehicle with a load sensing hydraulic control system is provided. The vehicle includes a frame, a plurality of traction devices configured to propel the frame on the ground, a plurality of hydraulic actuators, a variable displacement pump including a pump displacement controller receiving a pump control signal, the variable displacement pump being in fluid communication with the hydraulic actuators through a discharge passage, a load sense system providing maximum pressure signal indicative of the maximum pressure needed by the plurality of hydraulic actuators during operation of the vehicle, an orifice receiving the maximum pressure signal, the orifice being in fluid communication with the pump displacement controller, and means for maintaining a pressure differential over the orifice below a predetermined level.

According to yet another aspect of an exemplary embodiment of the present disclosure, a vehicle with a load sensing hydraulic control system is provided. The vehicle includes a frame, a plurality of traction devices configured to propel the frame on the ground, a plurality of hydraulic actuators, a variable displacement pump including a pump displacement controller receiving a pump control signal, the variable displacement pump being in fluid communication with the hydraulic actuators through a discharge passage, a load sense system providing maximum pressure signal indicative of the maximum pressure needed by the plurality of hydraulic actuators during operation of the vehicle, a compensator configured to reduce pressure level received to pressure required by an associated actuator at least in part based on maximum pressure signal received at input to compensator, and a load sense regulator providing pump discharge pressure to input of compensator when the maximum pressure signal decreases.

BRIEF DESCRIPTION OF THE DRAWINGS

The above-mentioned and other features of this disclosure, and the manner of attaining them, will become more apparent and the disclosure itself will be better understood by reference to the following description of embodiments of the disclosure taken in conjunction with the accompanying drawings, wherein.

Figure 1:
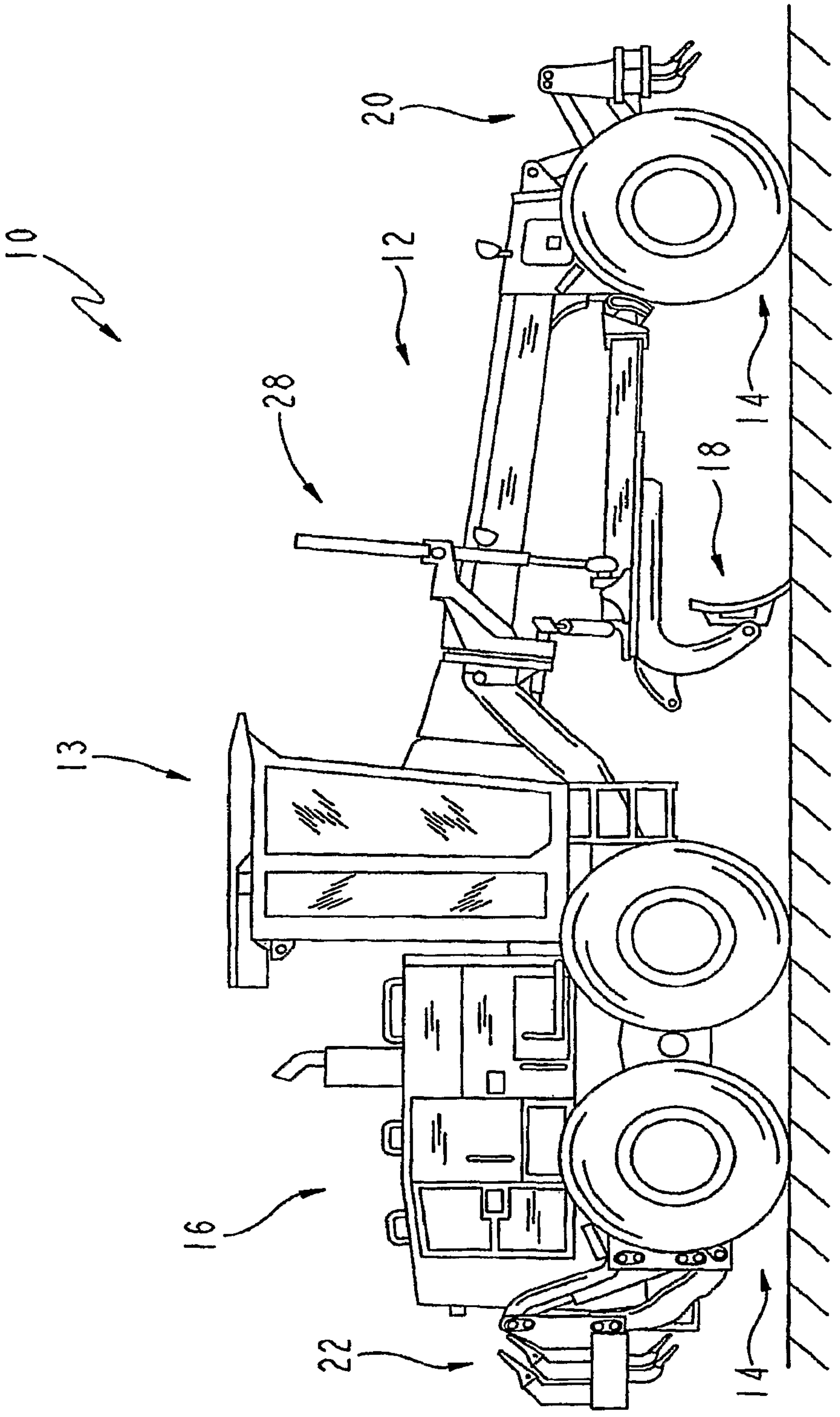
FIG. 1 is a side elevation view of a grader showing the grader including a frame, a cab supported by the frame, a blade extending below the frame, and a plurality of wheels supporting the frame on the ground.

Corresponding reference characters indicate corresponding parts throughout the several views. Although the drawings represent embodiments of the present disclosure, the drawings are not necessarily to scale and certain features may be exaggerated in order to better illustrate and explain the present disclosure.

DETAILED DESCRIPTION OF THE EXEMPLARY EMBODIMENTS

The embodiments disclosed below are not intended to be exhaustive or limit the disclosure to the precise forms disclosed in the following detailed description. Rather, the embodiments are chosen and described so that others skilled in the art may utilize their teachings.

A motor grader 10 is shown in FIG. 1 for spreading and leveling dirt, gravel, or other materials. Grader 10 includes an articulated frame 12, a passenger cab 13, and plurality of wheels 14 to propel frame 12 and the remainder of grader 10 along the ground, an engine 16 to power operation of grader 10, and a blade 18 for spreading and leveling. In addition to blade 18, grader 10 is provided with a scarifier 20 and a ripper 22 for working the soil.

Figure 2:
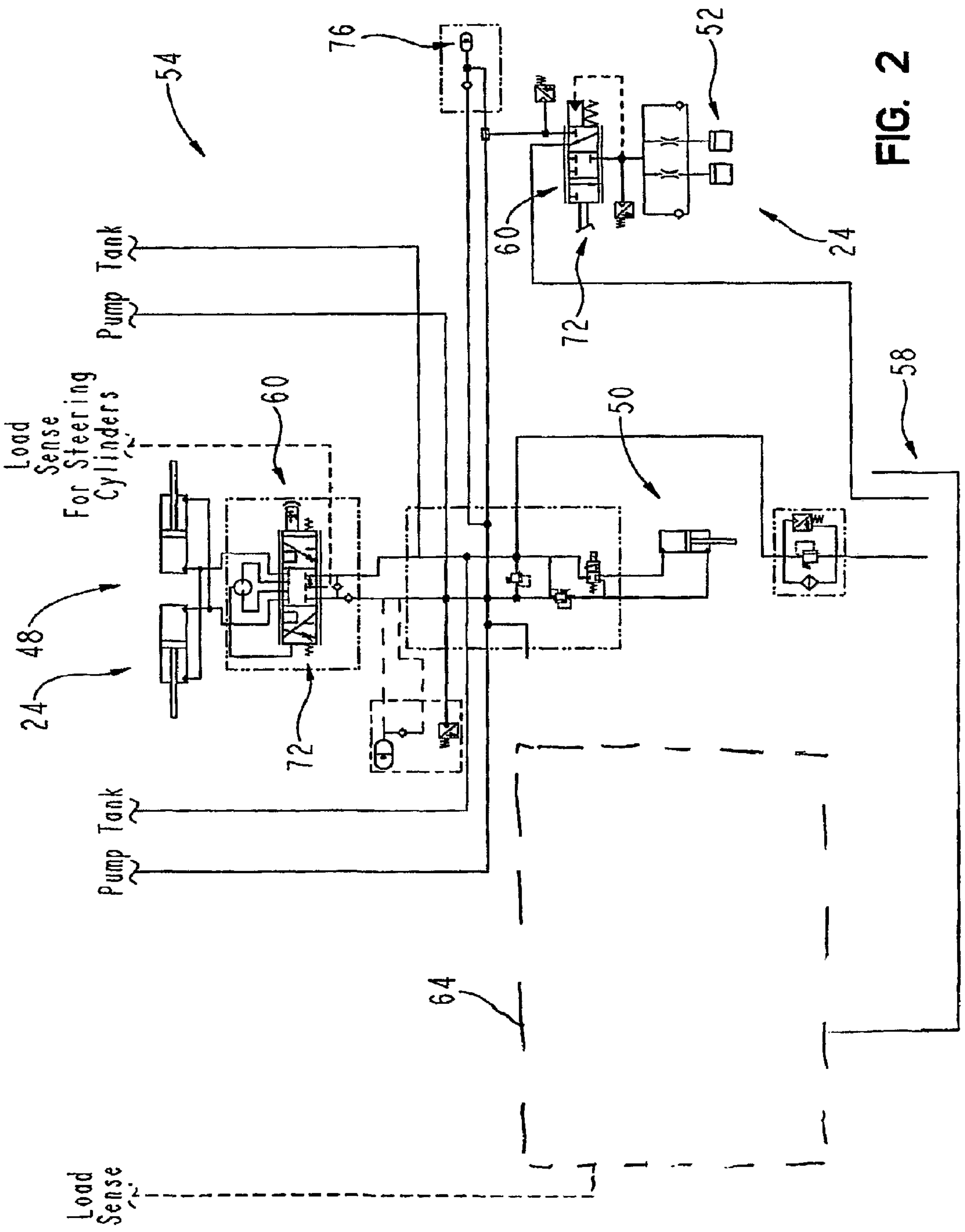
FIG. 2 is a schematic view of a portion of a hydraulic control system of the grader of FIG. 1 showing a differential pressure control system.
Figure 3:
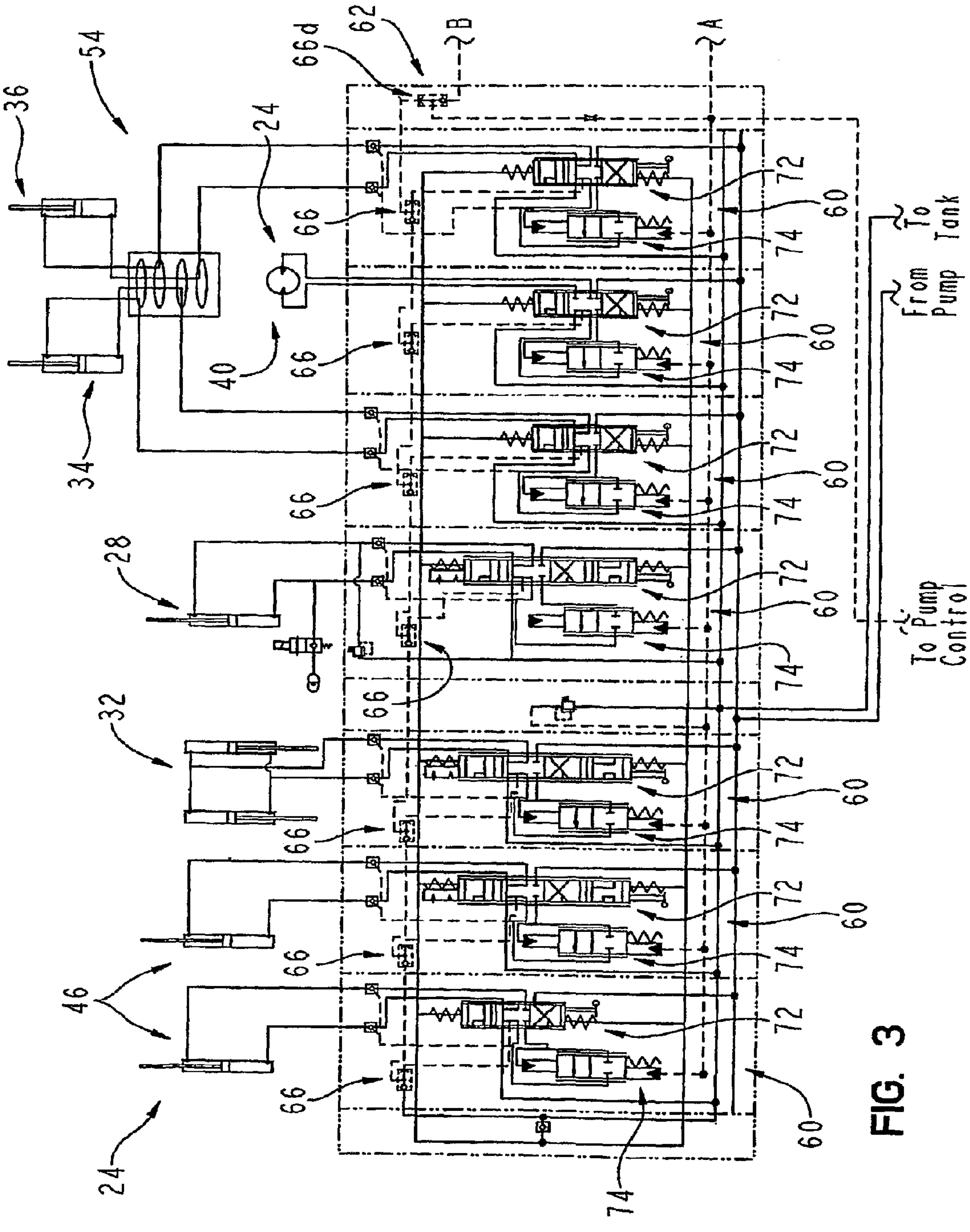
FIG. 3 is a schematic view of another portion of the hydraulic control system showing a left bank of hydraulic control valves and the hydraulic devices controlled by the control valves.
Figure 4:
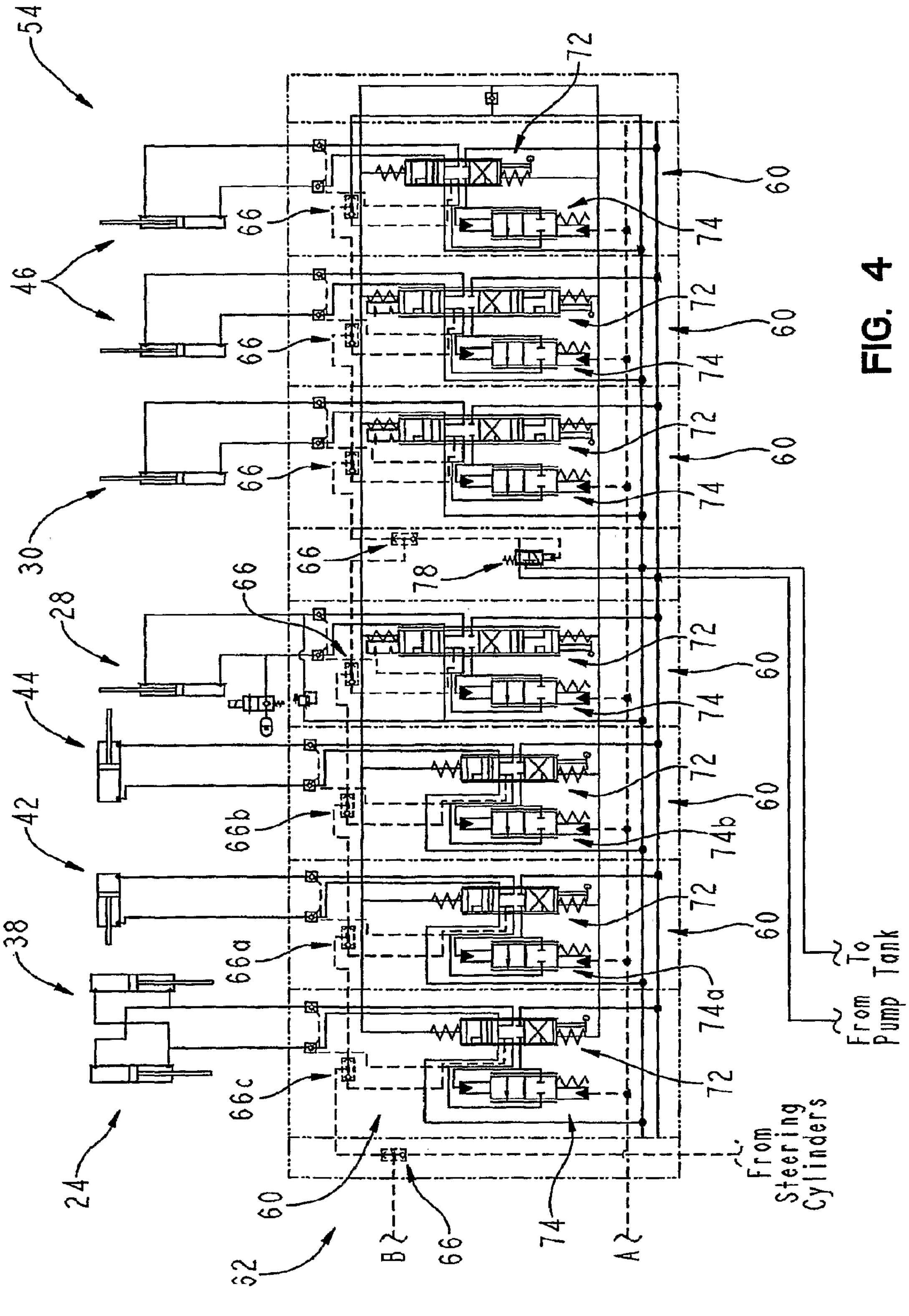
FIG. 4 is a schematic view of another portion of the hydraulic control system showing a right bank of hydraulic control valves and the hydraulic devices controlled by the control valves.

To move and power the various components of grader 10, grader 10 includes a plurality of hydraulic actuators 24 as shown in FIG. 2. As shown in FIGS. 2-4, such actuators 24 include blade-lift cylinders 28 to raise and lower blade 18 (FIG. 1), scarifier cylinder 30 to raise and lower scarifier 20 (FIG. 1), ripper cylinders 32 to raise, lower and operate ripper 22 (FIG. 1), a blade side shift cylinder 34 to shift blade 18 (FIG. 1) laterally, a blade tilt cylinder 36 to adjust the tilt of blade 18 (FIG. 1), articulation cylinders 38 to power articulation of frame 12 (FIG. 1), blade circle rotation motor 40 to permit rotation of blade 18 (FIG. 1) about a vertical axis, a circle side shift cylinder 42, a wheel lean cylinder 44 to control the tilt of front wheels 14 (FIG. 1) during turning, auxiliary cylinders 46 for optional features, steering cylinders 48 to control the direction of front wheels 14 (FIG. 1), saddle locking pin cylinder 50, and brake pistons 52 of the brakes to control the speed of grader 10 (FIG. 1).

Figure 5:
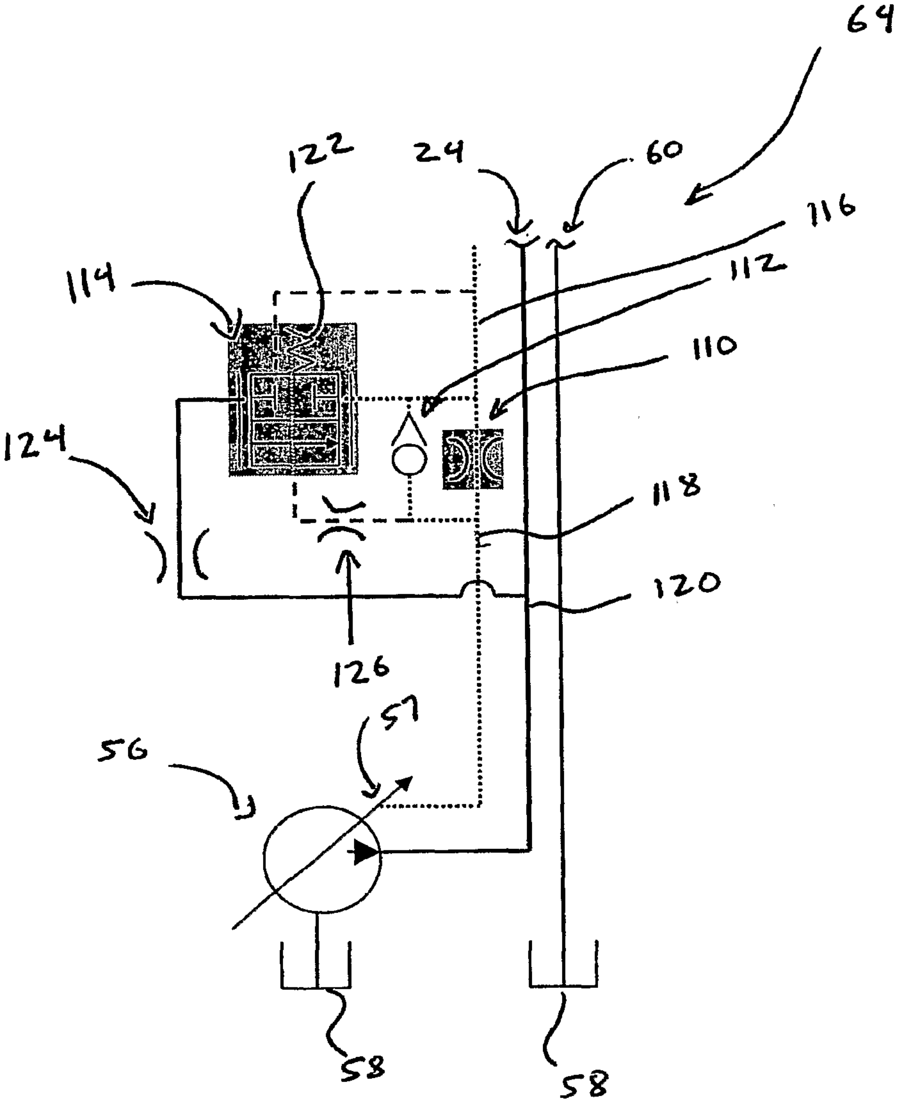
FIG. 5 is a schematic view of another portion of the hydraulic control system showing a differential pressure control system.

To power and control hydraulic actuators 24, grader 10 (FIG. 1) includes hydraulic control system 54 as shown in FIGS. 2-4. As illustrated in FIG. 2, hydraulic control system 54 includes a differential pressure control system 64. As shown in FIG. 5, differential pressure control system 64 includes a pressure source or hydraulic pump 56 that pressurizes the hydraulic fluid and a hydraulic fluid tank 58 that receives hydraulic fluid back from actuators 24. Pressure source or hydraulic pump 56 also includes pump displacement controller 57 configured to receive a pump control signal. As shown in FIG. 2, hydraulic control system 54 also includes a plurality of hydraulic controls 60 that control the flow and pressure of hydraulic fluid provided to actuators 24.

Still referring to FIG. 2, hydraulic control system 54 operates at a range of pressures depending on the needs of actuators 24. As illustrated in FIG. 3, system 54 includes a load sensor or load sense system 62 that detects the maximum pressure required by actuators 24 and a differential pressure control system 64 (FIG. 2) that controls the output pressure from pump 56 (FIG. 5). Load sense system 62 sends a hydraulic signal through differential pressure control system 64 so that pump 56 (FIG. 5) provides enough pressure at any given time to operate the actuator 24 that needs the maximum pressure.

As shown in FIGS. 3 and 4, load sense system 62 includes a plurality of shuttle disks or comparators 66 that communicate with actuators 24 to determine their current pressure load or pressure need. Each actuator 24 has an associated comparator 66 and all comparators 66 are coupled together in series so that maximum pressure needed by the comparators 66 is determined. Each comparator 66 includes a pair of inputs and an output. Typically, each comparator 66 receives a pressure signal from another comparator 66 and an actuator 24 through one of the plurality of controls 60. Each comparator 66 provides an output equal to the higher signal. As shown in FIG. 4, for example, comparator 66*a* receives a signal from circle side shift cylinder 42 and a signal from comparator 66*b* associated with wheel lean cylinder 44. If it is assumed that the pressure load need from circle side shift cylinder 42 is 1500 psi and the output signal pressure from wheel lean cylinder 44 is 1350 psi, comparator 66*a* will output a hydraulic signal of 1500 psi, the higher of the two signals, to comparator 66*c* associated with articulation cylinders 38.

As shown in FIG. 3, comparator 66*d* is the last comparator 66 in the series of comparators 66. Comparator 66*d* provides a hydraulic signal to differential pressure control system 64 equal to the maximum pressure input to system 64. Based on the signal, differential pressure control system 64 assists in adjusting the output pressure of pump 56 to provide sufficient pressure to operate the actuator 24 requiring the most pressure (circle side shift cylinder 42 in the example). Differential pressure control system 64 may regulate pump 56 as described in greater detail below.

Pump 56 (FIG. 5) provides hydraulic fluid at the maximum needed pressure to each of the hydraulic controls 60. Each hydraulic control 60 includes a spool valve 72 that regulates the flow rate and direction of flow of hydraulic fluid to each actuator 24 and a pressure compensator 74 that regulates the pressure of the hydraulic fluid supplied to each actuator 24. An operator controls the position of spool valves 72 using levers to control the flow rate and direction of flow of fluid to actuators 24. Pressure compensators 74 receive the hydraulic signal from comparator 66*d* that indicates the maximum pressure needed by actuators 24. Using this signal as a pilot signal and another pilot signal sent from the respective actuator 24 through spool valve 72, pressure compensators 74 provide hydraulic fluid back to spool valve 72 and the respective actuators 24 at the required pressure for each respective actuator 24. If an actuator 24 requires the maximum pressure indicated by the signal from comparator 66*d*, the respective compensator 74 provides that pressure. If an actuator 24 requires less than the maximum pressure, the respective compensator 74 provides a pressure drop that lowers the fluid pressure to the pressure required for the respective actuator 24.

Pump 56 (FIG. 5) may provide output pressure that is, for example, 400 psi greater than the hydraulic signal provided by comparator 66*d*. The 400 psi difference may compensate for pressure losses between the output of pump 56 (FIG. 5) and the actuator requiring the most pressure. For example, as described above and as illustrated in FIG. 4, it was assumed that side shift cylinder 42 needed 1500 psi of pressure and wheel lean cylinder 44 needed 1350 psi of pressure. Assuming 1500 psi was the maximum pressure required for all actuators 24, hydraulic pump 56 (FIG. 5) may output 1900 psi (1500 psi+400 psi), compensator 74*a* associated with side shift cylinder 42 would provide no pressure drop (other than some inherent pressure drop), and compensator 74*b* associated with wheel lean cylinder 44 would provide 150 psi pressure drop. Because of the inherent pressure drops between pump 56 (FIG. 5) and side shift cylinder 42 (approximately 400 psi), 1500 psi of pressure is supplied to side shift cylinder 42 and 1350 psi of pressure is supplied to wheel lean cylinder 44. Thus, although one or more of actuators 24 is operating at the maximum needed pressure, other actuators 24 are operating at lower pressures because they do not require the higher maximum pressure.

As shown in FIG. 4, signal regulator 78 is preferably a pressure reducing valve having an output pressure of 900 psi. Under normal operating conditions, signal regulator 78 receives hydraulic fluid from pump 56 (FIG. 5) at a minimum of approximately 1300 psi. During operation of actuators 24, signal regulator 78 may receive hydraulic fluid from pump 56 (FIG. 5) up to 2,750 psi. Regardless of what pressure regulator 78 receives from pump 56 (FIG. 5) during normal operation, the pressure signal from regulator 78 is about 900 psi.

As shown in FIG. 4, this 900 psi pressure signal is fed into load sense system 62. Thus, load sense system 62 will always have at least one input providing a hydraulic pressure signal of at least 900 psi. Even if all actuators 24 require less than 900 psi, the output from comparator 66*d* to pump control 64 will be 900 psi and the output from pump 56 (FIG. 5) will be 1300 psi.

Now referring to FIG. 5, differential pressure control 64 is shown in greater detail. Differential pressure control 64 includes orifice 110 which substantially restricts fluid flow, check valve 112 which substantially prevents fluid flow in at least one direction, and load sense regulator 114 which is described in more detail below. Orifice 110 is coupled to valve passage 116 which is in fluid communication with the plurality of hydraulic actuators 24 (FIG. 2) and provides load sense pressure to the plurality of hydraulic actuators 24 (FIG. 2). Orifice 110 is also coupled to pump passage 118 which is in fluid communication with the pressure source or hydraulic pump 56. Pump passage 118 provides load sense pressure to the pressure source or hydraulic pump 56. Orifice 110 damps fluctuations in pump passage 118 in relation to valve passage 116 and substantially prevents hydraulic pump 56 from sensing substantial fluctuations. Orifice 110 also allows for substantial differences in pressure between valve passage 116 and pump passage 118. Orifice 110 may have a specific diameter, such as about 0.6 millimeters.

Check valve 112 is also coupled to valve passage 116 and pump passage 118. Check valve 112 substantially allows fluid flow from valve passage 116 to pump passage 118 but substantially restricts fluid flow from pump passage 118 to valve passage 116. The combination of check valve 112 and orifice 110 allows for the hydraulic system 54 to dampen sensing by hydraulic pump 56 which in turn stabilizes hydraulic system 54.

Load sense regulator 114 is coupled to valve passage 116, pump passage 118, and discharge passage 120. Load sense regulator 114 is illustrated as a two position/two port valve. Load sense regulator 114 is also illustrated as biased to a closed position by a biasing element 122. Load sense regulator 114 may be set to bias to the open position at a predetermined differential pressure between valve passage 116 and pump passage 118. For example, biasing element 122 may be set to be overcome at 60 psi differential pressure. As illustrated, load sense regulator 114 is configured to be acted upon by pump passage 118 pressure.

In operation, load sense regulator 114 maintains differential pressure between valve passage 116 and pump passage 118 by discharging through discharge passage 120. Load sense regulator 114 may minimize differential pressure between valve passage 116 and pump passage 118. When pressure from pump passage 118 overcomes the bias of biasing element 112, load sense regulator 114 may shift from the closed position to the open position "backfilling" pressure into valve passage 116. Backfilling pressure into valve passage 116 may provide valve passage 116 with a pressure that is more indicative to pump passage 118 and therefore more indicative of pressure provided by pressure source or hydraulic pump 56 into discharge passage 120, and ultimately to actuators 24.

Returning to the explanatory example, because of the inherent pressure drops between pump 56 (FIG. 5) and side shift cylinder 42 (approximately 400 psi), 1500 psi of pressure is supplied to side shift cylinder 42 and 1350 psi of pressure is supplied to wheel lean cylinder 44. Thus, although one or more of actuators 24 is operating at the maximum needed pressure, other actuators 24 are operating at lower pressures because they do not require the higher maximum pressure.

For example, as described above, it was assumed that side shift cylinder 42 (FIG. 2) needed 1500 psi of pressure and wheel lean cylinder 44 (FIG. 2) needed 1350 psi of pressure. Assuming 1500 psi was the maximum pressure required for all actuators 24, hydraulic pump 56 would output 1900 psi (1500 psi+400 psi), compensator 74*a* associated with side shift cylinder 42 would provide no pressure drop (other than some inherent pressure drop), and compensator 74*b* associated with wheel lean cylinder 44 would provide 150 psi pressure drop. If side shift cylinder 42 suddenly no longer needed 1500 psi, pump 56 may sense pump passage 118 at near 1500 psi, due to operation of orifice 110 and check valve 112. Valve passage 116 may quickly represent the new maximum pressure required of 1350 psi of pressure for wheel lean cylinder 44 (FIG. 1). Differential pressure control system 64 may sense a pressure differential between valve passage 116 and pump passage 118 and backfill pressure into valve passage 116. Note that the drop in pressure would exceed a potential predetermined differential of 60 psi. Differential pressure control system 64 may allow compensators 74 to sense a pressure in valve passage 116 that is similar to the pressure in pump passage 118 sensed and delivered by pump 56.

Still referring to FIG. 5, differential pressure control 64 optionally includes second orifice 124 coupled to discharge passage 120. Second orifice 124 reduces the amount of flow to backfill valve passage 116. Second orifice 124 may have a specific diameter, such as about 1.5 millimeters. Optionally differential pressure control 64 includes third orifice 126 coupled to pump passage 118. Third orifice 126 reduces the amount of flow available to bias load sense regulator 114. Third orifice 126 provides another variable or mechanism to set or create a predetermined pressure differential.

The control system above has been described in reference to a grader. According to other embodiments of the present disclosure, the control system may be provided on other vehicles such as articulated dump trucks, backhoe loaders, dozers, crawler loaders, excavators, skid steers, scrapers, trucks, cranes, or any other type of vehicles known to those of ordinary skill in the art. In addition to wheels, other types of traction devices may be provided on such vehicles such as tracks or other traction devices known to those of ordinary skill in the art.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A load sensing hydraulic control system for use with a vehicle including a frame, a plurality of traction devices configured to propel the frame on the ground, a plurality of hydraulic actuators, a variable displacement pump including a pump displacement controller receiving a pump control signal, the variable displacement pump being in fluid communication with the plurality of hydraulic actuators through a discharge passage, and a load sense system providing a maximum pressure signal indicative of the maximum pressure needed by the plurality of hydraulic actuators during operation of the vehicle, the load sensing hydraulic control system comprising:

an orifice receiving the maximum pressure signal, the orifice being in fluid communication with the pump displacement controller, a check valve receiving the maximum pressure signal and bypassing the orifice when the maximum pressure signal is greater than the pump control signal, and a load sense regulator in fluid communication with the pump displacement controller, the load sense regulator maintaining a pressure differential over the orifice below a predetermined level.

2. The control system of claim 1 wherein the load sense regulator is coupled to the discharge passage.

3. The control system of claim 2 wherein the load sense regulator is configured to backfill pressure from a pump passage downstream of the orifice into a valve passage upstream of the orifice.

4. The control system of claim 2 further comprising a second orifice coupled to the discharge passage.

5. The control system of claim 4 wherein the second orifice is adjacent to the load sense regulator.

6. The control system of claim 4 wherein the second orifice has a diameter of about 1.5 millimeters.

7. The control system of claim 3 wherein the load sense regulator is configured to reduce the pressure differential between the valve passage and the pump passage.

8. The control system of claim 1 wherein the orifice has a diameter of about 0.6 millimeters.

9. The control system of claim 3 further comprising a third orifice coupled to the pump passage, the third orifice configured to act upon the load sense regulator.

10. A vehicle including:

a frame, a plurality of traction devices configured to propel the frame on the ground, a plurality of hydraulic actuators, a variable displacement pump including a pump displacement controller receiving a pump control signal, the variable displacement pump being in fluid communication with the plurality of hydraulic actuators through a discharge passage, a load sense system providing a maximum pressure signal indicative of the maximum pressure needed by the plurality of hydraulic actuators during operation of the vehicle, and the load sensing hydraulic control system of claim 1.

11. The control system of claim 1 coupled to the vehicle.

12. A load sensing hydraulic control system for use with a vehicle including a frame, a plurality of traction devices configured to propel the frame on the ground, a plurality of hydraulic actuators, a variable displacement pump including a pump displacement controller receiving a pump control signal, the variable displacement pump being in fluid communication with the plurality of hydraulic actuators through a discharge passage, and a load sense system providing a maximum pressure signal indicative of the maximum pressure needed by the plurality of hydraulic actuators during operation of the vehicle, the load sensing hydraulic control system comprising:

an orifice receiving the maximum pressure signal, the orifice being in fluid communication with the pump displacement controller, and means for maintaining a pressure differential over the orifice below a predetermined level.

13. A vehicle including a frame, a plurality of traction devices configured to propel the frame on the ground, a plurality of hydraulic actuators, a variable displacement pump including a pump displacement controller receiving a pump control signal, the variable displacement pump being in fluid communication with the plurality of hydraulic actuators through a discharge passage, a load sense system providing a maximum pressure signal indicative of the maximum pressure needed by the plurality of hydraulic actuators during operation of the vehicle, and the load sensing hydraulic control system of claim 12.

14. A load sensing hydraulic control system for use with a vehicle including a frame, a plurality of traction devices configured to propel the frame on the ground, a plurality of hydraulic actuators, a variable displacement pump including a pump displacement controller receiving a pump control signal, the variable displacement pump being in fluid communication with the plurality of hydraulic actuators through a discharge passage, a load sense system providing a maximum pressure signal indicative of the maximum pressure needed by the plurality of hydraulic actuators during operation of the vehicle, a compensator configured to reduce a pressure level received to a pressure required by an associated hydraulic actuator at least in part based on the maximum pressure signal received at an input to the compensator, the load sensing hydraulic control system comprising:

a load sense regulator providing a pump discharge pressure to the input of the compensator when the maximum pressure signal decreases.

15. The control system of claim 14 further comprising an orifice receiving the maximum pressure signal, the orifice being in fluid communication with the pump displacement controller.

16. The control system of claim 15 further comprising a check valve receiving the maximum pressure signal and bypassing the orifice when the maximum pressure signal is greater than the pump control signal.

17. The control system of claim 15 wherein the load sense regulator maintains a pressure differential over the orifice below a predetermined level.

18. A vehicle including a frame, a plurality of traction devices configured to propel the frame on the ground, a plurality of hydraulic actuators, a variable displacement pump including a pump displacement controller receiving a pump control signal, the variable displacement pump being in fluid communication with the plurality of hydraulic actuators through a discharge passage, a load sense system providing a maximum pressure signal indicative of the maximum pressure needed by the plurality of hydraulic actuators during operation of the vehicle, a compensator configured to reduce a pressure level received to a pressure required by an associated hydraulic actuator at least in part based on the maximum pressure signal received at an input to the compensator, and the load sensing hydraulic control system of claim 14.

19. A vehicle including a frame, a plurality of traction devices configured to propel the frame on the ground, a plurality of hydraulic actuators, a variable displacement pump in fluid communication with the plurality of hydraulic actuators, a load sense system providing a maximum pressure signal indicative of the maximum pressure needed by the plurality of hydraulic actuators during operation of the vehicle, the load sense system including:

an orifice that receives the maximum pressure signal upstream of the orifice and generates a pump control signal downstream of the orifice, the pump control signal controlling the variable displacement pump, and a load sense regulator that backfills the maximum pressure signal upstream of the orifice when the pump control signal downstream of the orifice exceeds the maximum pressure signal upstream of the orifice by a predetermined differential pressure.

20. The vehicle of claim 19, wherein the load sense system further includes a check valve that bypasses the orifice when the maximum pressure signal upstream of the orifice exceeds the pump control signal downstream of the orifice.

21. The vehicle of claim 19, wherein the load sense system further includes a signal regulator to ensure that the maximum pressure signal is at or above a predetermined minimum value.

* * * * *